United States Patent
Stiles, Jr. et al.

(10) Patent No.: US 9,693,537 B2
(45) Date of Patent: Jul. 4, 2017

(54) AQUACULTURE PUMP SYSTEM AND METHOD

(71) Applicants: Robert W. Stiles, Jr., Cary, NC (US); Dennis P. Delong, Raleigh, NC (US)

(72) Inventors: Robert W. Stiles, Jr., Cary, NC (US); Dennis P. Delong, Raleigh, NC (US)

(73) Assignee: Pentair Water Pool and Spa, Inc., Cary, NC (US)

(*) Notice: Subject to any disclaimer, the term of this patent is extended or adjusted under 35 U.S.C. 154(b) by 259 days.

(21) Appl. No.: 13/710,073

(22) Filed: Dec. 10, 2012

(65) Prior Publication Data

US 2013/0180460 A1 Jul. 18, 2013

Related U.S. Application Data

(60) Provisional application No. 61/568,427, filed on Dec. 8, 2011.

(51) Int. Cl.
| | | |
|---|---|---|
| *A01K 63/04* | (2006.01) | |
| *B01F 5/10* | (2006.01) | |
| *B01F 15/00* | (2006.01) | |
| *B01F 15/04* | (2006.01) | |
| *B01F 3/04* | (2006.01) | |

(52) U.S. Cl.
CPC ........... *A01K 63/047* (2013.01); *A01K 63/04* (2013.01); *A01K 63/042* (2013.01); *A01K 63/045* (2013.01); *B01F 3/04503* (2013.01); *B01F 5/106* (2013.01); *B01F 15/0022* (2013.01); *B01F 15/0408* (2013.01)

(58) Field of Classification Search
CPC ...... A01K 63/04; A01K 63/00; A01K 63/003; A01K 63/006; A01K 63/042; A01K 63/045; A01K 63/047; A01K 61/00; A01K 61/003
USPC ........ 119/245, 259–261, 263–264, 215–218, 119/224–228, 231–232
See application file for complete search history.

(56) References Cited

U.S. PATENT DOCUMENTS

| | | | |
|---|---|---|---|
| 299,515 | A | 6/1884 | Brooks |
| 867,463 | A | 10/1907 | Yingling |
| 3,915,589 | A | 10/1975 | Vander Linden |
| 4,030,450 | A | 6/1977 | Hoult |

(Continued)

FOREIGN PATENT DOCUMENTS

| | | |
|---|---|---|
| CN | 201299045 Y | 9/2009 |
| CN | 201451050 U | 5/2010 |

(Continued)

OTHER PUBLICATIONS

Aquatic Eco-Systems Inc., Sales Brochure entitled, "Recirculating Aquaculture Systems," 8 pages.

(Continued)

*Primary Examiner* — Joshua Huson
(74) *Attorney, Agent, or Firm* — Quarles & Brady LLP

(57) ABSTRACT

Embodiments of the invention provide a method of operating a pump in an aquaculture system including a water tank that houses aquatic life. The method includes monitoring a dissolved oxygen level in the culture tank, determining a flow rate threshold based on the dissolved oxygen level, and changing a speed of the pump to maintain a current flow rate through the culture tank above the flow rate threshold.

16 Claims, 4 Drawing Sheets

(56) References Cited

U.S. PATENT DOCUMENTS

| | | | |
|---|---|---|---|
| 4,119,495 A | 10/1978 | Belyaev et al. | |
| 4,203,389 A | 5/1980 | Gasper, Jr. et al. | |
| 4,271,099 A | 6/1981 | Kukla | |
| 4,284,900 A | 8/1981 | Botts | |
| 4,359,984 A | 11/1982 | Nakao | |
| 4,398,937 A | 8/1983 | van Aller et al. | |
| 4,473,970 A | 10/1984 | Hills | |
| 4,522,727 A | 6/1985 | Weber | |
| 4,654,147 A | 3/1987 | Bagley | |
| 4,664,680 A | 5/1987 | Weber | |
| 4,749,493 A | 6/1988 | Hicks | |
| 4,765,807 A | 8/1988 | Henriksen | |
| 4,913,093 A | 4/1990 | VanGorder | |
| 4,926,795 A | 5/1990 | Hamilton et al. | |
| 4,975,106 A | 12/1990 | Ferguson | |
| 5,013,429 A | 5/1991 | Krofta | |
| 5,038,715 A | 8/1991 | Fahs, II | |
| 5,055,186 A | 10/1991 | Van Toever | |
| 5,081,954 A | 1/1992 | Monus | |
| 5,121,708 A | 6/1992 | Nuttle | |
| 5,133,287 A | 7/1992 | Hicks | |
| 5,139,791 A | 8/1992 | Nakajima et al. | |
| 5,158,037 A | 10/1992 | Engelbart | |
| 5,165,925 A | 11/1992 | Leong | |
| 5,178,093 A | 1/1993 | Reese et al. | |
| 5,206,243 A | 4/1993 | Hofmann et al. | |
| 5,215,767 A | 6/1993 | Mitsuhashi | |
| 5,227,055 A | 7/1993 | Timmons | |
| 5,320,068 A | 6/1994 | Redditt | |
| 5,337,698 A | 8/1994 | Widmyer | |
| 5,353,745 A * | 10/1994 | Fahs, II | 119/226 |
| 5,397,466 A | 3/1995 | Lin | |
| 5,445,740 A | 8/1995 | Malone | |
| 5,458,779 A | 10/1995 | Odegaard | |
| 5,482,630 A | 1/1996 | Lee et al. | |
| 5,540,555 A | 7/1996 | Corso et al. | |
| 5,543,039 A | 8/1996 | Odegaard | |
| 5,593,574 A | 1/1997 | Van Toever | |
| 5,593,600 A | 1/1997 | Solomon | |
| 5,596,947 A | 1/1997 | Creppel et al. | |
| 5,636,595 A | 6/1997 | Lunde et al. | |
| 5,711,983 A | 1/1998 | Kyle et al. | |
| 5,728,287 A | 3/1998 | Hough et al. | |
| 5,732,655 A | 3/1998 | Baba et al. | |
| 5,747,311 A | 5/1998 | Jewell | |
| 5,762,024 A | 6/1998 | Meilahn | |
| 5,770,080 A | 6/1998 | Malone | |
| 5,780,448 A | 7/1998 | Davis | |
| 5,820,759 A | 10/1998 | Stewart et al. | |
| 5,839,391 A | 11/1998 | Shaar | |
| 5,868,940 A | 2/1999 | Gurfinkel | |
| 5,884,585 A | 3/1999 | Streichenberger | |
| 5,893,337 A | 4/1999 | Sevic | |
| 5,906,750 A | 5/1999 | Haase | |
| 5,945,171 A | 8/1999 | Cook | |
| 5,961,831 A | 10/1999 | Lee et al. | |
| 5,970,917 A | 10/1999 | Keith, Jr. | |
| 5,978,315 A | 11/1999 | Molaug | |
| 5,979,363 A | 11/1999 | Shaar | |
| 6,015,497 A | 1/2000 | Steen, Jr. | |
| 6,016,770 A | 1/2000 | Fisher | |
| 6,017,020 A | 1/2000 | Baughman et al. | |
| 6,024,875 A | 2/2000 | Sevic | |
| 6,027,700 A | 2/2000 | Ishioka et al. | |
| 6,065,245 A | 5/2000 | Seawright | |
| 6,083,405 A | 7/2000 | Tanaka et al. | |
| 6,117,313 A | 9/2000 | Goldman et al. | |
| 6,117,383 A | 9/2000 | Kirschbaum | |
| 6,117,457 A | 9/2000 | Devos et al. | |
| 6,123,846 A | 9/2000 | Kikuchi | |
| 6,126,829 A | 10/2000 | Gunnarsson et al. | |
| 6,155,794 A | 12/2000 | Wu | |
| 6,171,469 B1 | 1/2001 | Hough et al. | |
| 6,171,480 B1 | 1/2001 | Lee et al. | |
| 6,180,614 B1 | 1/2001 | Davis | |
| 6,192,833 B1 | 2/2001 | Brune et al. | |
| 6,231,769 B1 | 5/2001 | Pean et al. | |
| 6,244,218 B1 | 6/2001 | McNeil | |
| 6,253,227 B1 | 6/2001 | Tompkins et al. | |
| 6,325,020 B1 | 12/2001 | Guigne et al. | |
| 6,325,842 B1 | 12/2001 | Caldwell et al. | |
| 6,379,546 B1 | 4/2002 | Braun | |
| 6,391,201 B1 | 5/2002 | Pelz | |
| 6,398,840 B1 | 6/2002 | Orta-Castro et al. | |
| 6,422,066 B1 | 7/2002 | Cordonnier et al. | |
| 6,428,710 B1 | 8/2002 | Kempen et al. | |
| 6,443,097 B1 | 9/2002 | Zohar et al. | |
| 6,447,681 B1 | 9/2002 | Carlberg et al. | |
| 6,451,612 B1 | 9/2002 | Campo et al. | |
| 6,461,590 B2 | 10/2002 | Spears | |
| 6,474,264 B1 | 11/2002 | Grimberg et al. | |
| 6,499,431 B1 | 12/2002 | Lin et al. | |
| 6,510,815 B1 | 1/2003 | Lagardere | |
| 6,517,724 B1 | 2/2003 | Malone | |
| 6,557,492 B1 | 5/2003 | Robohm | |
| 6,581,543 B1 | 6/2003 | Kolberg | |
| 6,584,935 B2 | 7/2003 | Zohar et al. | |
| 6,630,067 B2 | 10/2003 | Shieh et al. | |
| 6,638,434 B2 | 10/2003 | Otsuki | |
| 6,649,412 B1 | 11/2003 | Borggaard et al. | |
| 6,676,837 B2 | 1/2004 | Keeton, Jr. | |
| 6,677,861 B1 | 1/2004 | Henry et al. | |
| 6,722,314 B1 | 4/2004 | Crisinel et al. | |
| 6,798,347 B2 | 9/2004 | Henry et al. | |
| 6,827,036 B2 | 12/2004 | Connolly | |
| 6,849,189 B2 | 2/2005 | Curlee et al. | |
| 6,928,864 B1 | 8/2005 | Henry et al. | |
| 6,936,170 B2 | 8/2005 | Shieh et al. | |
| 6,938,506 B2 | 9/2005 | Henry et al. | |
| 6,946,074 B2 | 9/2005 | Malmqvist et al. | |
| 6,986,323 B2 | 1/2006 | Ayers | |
| 7,004,109 B2 | 2/2006 | Olive et al. | |
| 7,007,541 B2 | 3/2006 | Henry et al. | |
| 7,029,577 B2 | 4/2006 | Cummins | |
| 7,052,601 B2 | 5/2006 | Gravdal | |
| 7,063,855 B2 | 6/2006 | Hjaltason et al. | |
| 7,067,145 B2 | 6/2006 | Place et al. | |
| 7,138,926 B2 | 11/2006 | Henry et al. | |
| 7,156,048 B2 | 1/2007 | Olive et al. | |
| 7,166,211 B1 | 1/2007 | Boyd | |
| 7,175,683 B2 | 2/2007 | Cabello-Fuentes | |
| 7,189,323 B2 | 3/2007 | Lofqvist et al. | |
| 7,258,790 B2 | 8/2007 | Brune et al. | |
| 7,318,901 B2 | 1/2008 | Naess et al. | |
| 7,462,284 B2 | 12/2008 | Schreier et al. | |
| 7,484,476 B2 | 2/2009 | Stafford | |
| 7,517,459 B2 | 4/2009 | Des Aulniers | |
| 7,533,874 B2 | 5/2009 | Glomset | |
| 7,597,805 B2 | 10/2009 | Danielsson et al. | |
| 7,624,703 B2 | 12/2009 | Vago | |
| 7,654,728 B2 | 2/2010 | Wood et al. | |
| 7,702,473 B2 | 4/2010 | Widder et al. | |
| 7,770,814 B2 | 8/2010 | Archambeau et al. | |
| 7,806,584 B2 | 10/2010 | Wootan et al. | |
| 7,807,201 B2 | 10/2010 | Jeong et al. | |
| 7,832,920 B2 | 11/2010 | Wood et al. | |
| 7,845,913 B2 | 12/2010 | Stiles, Jr. et al. | |
| 7,854,597 B2 | 12/2010 | Stiles, Jr. | |
| 7,879,809 B2 | 2/2011 | Dick et al. | |
| 7,887,698 B2 | 2/2011 | Wood | |
| 7,910,001 B2 | 3/2011 | Michaels, II et al. | |
| 7,919,534 B2 | 4/2011 | Wood et al. | |
| 7,947,100 B1 | 5/2011 | Thomas et al. | |
| 7,947,172 B2 | 5/2011 | Aulniers | |
| 7,997,564 B2 | 8/2011 | Wu | |
| 2002/0082727 A1 | 6/2002 | Laflamme et al. | |
| 2002/0150476 A1 | 10/2002 | Lucke et al. | |
| 2002/0179524 A1 | 12/2002 | Malmqvist et al. | |
| 2003/0034284 A1 | 2/2003 | Wolfe | |
| 2003/0061004 A1 | 3/2003 | Discenzo | |
| 2003/0196942 A1 | 10/2003 | Jones | |
| 2004/0016241 A1 | 1/2004 | Street et al. | |
| 2004/0055960 A1 | 3/2004 | Mcneill | |
| 2004/0117330 A1 | 6/2004 | Ehlers et al. | |

(56) References Cited

U.S. PATENT DOCUMENTS

| | | |
|---|---|---|
| 2004/0129619 A1 | 7/2004 | Leach |
| 2005/0029178 A1 | 2/2005 | Haddas |
| 2005/0072732 A1 | 4/2005 | Lofqvist et al. |
| 2005/0123408 A1 | 6/2005 | Koehl |
| 2005/0199028 A1 | 9/2005 | Shin |
| 2005/0226731 A1 | 10/2005 | Mehlhorn et al. |
| 2006/0011555 A1 | 1/2006 | Aulniers |
| 2006/0054554 A1 | 3/2006 | Spears et al. |
| 2006/0132762 A1 | 6/2006 | Kirkpatrick et al. |
| 2006/0162667 A1* | 7/2006 | Papadoyianis et al. ...... 119/223 |
| 2006/0191828 A1 | 8/2006 | Cummins |
| 2006/0237044 A1 | 10/2006 | Ferguson et al. |
| 2007/0154323 A1* | 7/2007 | Stiles et al. .................. 417/44.1 |
| 2007/0227908 A1 | 10/2007 | Barnett |
| 2007/0251461 A1 | 11/2007 | Reichard et al. |
| 2008/0041773 A1 | 2/2008 | Morse |
| 2008/0044293 A1* | 2/2008 | Hanke et al. .................. 417/14 |
| 2009/0094765 A1 | 4/2009 | Osaka et al. |
| 2009/0152192 A1 | 6/2009 | Michaels, II et al. |
| 2010/0018931 A1 | 1/2010 | Aulniers |
| 2010/0038286 A1 | 2/2010 | Greaney et al. |
| 2010/0043718 A1* | 2/2010 | Chen .............................. 119/263 |
| 2010/0154717 A1 | 6/2010 | Glomset et al. |
| 2010/0307545 A1 | 12/2010 | Osaka et al. |
| 2011/0039321 A1 | 2/2011 | Tal et al. |
| 2011/0052416 A1* | 3/2011 | Stiles ............................. 417/42 |
| 2011/0290189 A1 | 12/2011 | Myers |
| 2011/0290191 A1 | 12/2011 | Boer et al. |
| 2011/0301531 A1 | 12/2011 | Spears et al. |
| 2012/0017840 A1* | 1/2012 | Allis ............................ 119/261 |
| 2012/0063921 A1 | 3/2012 | Stiles, Jr. et al. |
| 2012/0175308 A1 | 7/2012 | Jangbarwala et al. |
| 2012/0211417 A1 | 8/2012 | Vegso et al. |

FOREIGN PATENT DOCUMENTS

| | | |
|---|---|---|
| CN | 201917800 U | 8/2011 |
| CN | 201917803 U | 8/2011 |
| DE | 19909226 A1 | 1/2000 |
| EP | 2159210 A2 | 3/2010 |
| EP | 2188211 A1 | 5/2010 |
| EP | 2139313 B1 | 10/2012 |
| JP | 3157199 A | 7/1991 |
| JP | 3188999 A | 8/1991 |
| JP | 7170881 A | 7/1995 |
| JP | 11326312 A | 11/1999 |
| JP | 2006180829 A | 7/2006 |
| SU | 873999 A1 | 10/1981 |
| WO | 03099705 A2 | 12/2003 |
| WO | WO2008/131403 A1 | 10/2008 |
| WO | WO2009/013728 A1 | 1/2009 |
| WO | 2011150463 A1 | 12/2011 |

OTHER PUBLICATIONS

RK2 Systems Product List, 1 page.
In-Situ Aquaculture, AquaTROLL 400 Multiparameter Instrument Brochure, 2 pages.
Hydrotech AB Hydrotech Filters Brochure, 4 pages.
Thomas M. Losordo, Michael Masser and James E. Rakocy, Southern Regional Aquaculture Center, "Recirculating Aquaculture Tank Production Systems" Apr. 1999, 12 pages.
United Food Technologies AG, UFT-Denitrification Equipment Brochure, 2 pages.
United Food Technologies AG, UFT-Aquaculture Automation Brochure, 2 pages.
Aquasonic PTY Ltd., Sweetwater Oxygen Cone Installation Guide, 2 pages.
The Linde Group, Aquaculture Equipment Portfolio, 12 pages.
Water Management Technologies, Inc., Micro Diffussers Brochure, 1 page.
International Search Report and Written Opinion issued in PCT/US2014/030511, mailed Aug. 11, 2014, 15 pages.
Summerfelt; Oxygenation and carbon dioxide control in water reuse system, Aquacultural Engineering 22(1-2): 87-108, 2000, retrieved Jun. 30, 2014, 22 pages.
Ghaly et al., "Desalination of Saline Sludges Using Ion-Exchange Column with Zeolite", American Journal of Environmental Sciences 4 (4), 2008, pp. 388-396, Department of Process Engineering and Applied Sciences, Dalhousie University, Halifax, Nova Scotia, B3J 2X4, Canada.
Chen et al., "Aquaculture Sludge Treatment Using an Anaerobic and Facultative Lagoon System", pp. 1-10.
Lindell et al. "Effluent Treatment and Residuals Management Using Land Application to Recycle Nutrients from a Large-Scale Recirculating Aquaculture Facility", One (1) Page.
Twarowka et al., "Water Treatment and Waste Characterization Evaluation of an Intensive Recirculating Fish Production System", pp. 1-12.
Easter et al., "Waste Characterization and Disposal from a Recirculating Aquaculture System Producing Hybrid Striped Bass", pp. 1-6.
Adler et al., "Conveyor Production Strategy Enhances Nutrient Byproduct Recovery from Aquaculture Wastewater", pp. 1-11.
Duangpaseuth et al., "Seafood Processing", Term Project 2, ED7820 Industrial Waste Abatement and Management, Asian Institute of Technology, pp. 1-24.
Falk et al, "Wastewater Technology Fact Sheet Chemical Precipitation", United States Environmental Protection Agency, Office of Water, Sep. 2000, EPA 832-F-00-018, 8 pages.
International Search Report and Written Opinion of the International Searching Authority issued in PCT Application No. PCT/US14/27993, mailed Jul. 25, 2014, 9 pages.
Robert S. Carrow, Variable Frequency Drives, Electrician's Technical Reference (published by Delmar) dated 2001.
Danfoss VLT8000 Aqua Instruction Manual, dated Apr. 16, 2004.
Product Focus—New AC Drive Series Targets Water, Wastewater Applications, WaterWorld Magazine, vol. 8 No. 7, dated Jul. 2002.
Pentair IntelliTouch Operating Manual dated May 22, 2003.
Pentair RS-485 Pool Controller Adapter Published Advertisement from Pool and Spa News, dated Mar. 22, 2002.
Compool CP3800 Pool-Spa Control System Installation and Operating Instructions, dated Nov. 7, 1997.
Hayward Owner's Guide, Pro-Series High-Rate Sand Filter, dated 2002.

* cited by examiner

AQUACULTURE PUMP SYSTEM AND METHOD

RELATED APPLICATIONS

This application claims priority under 35 U.S.C. §119 to U.S. Provisional Patent Application No. 61/568,427 filed on Dec. 8, 2011, the entire contents of which is incorporated herein by reference.

BACKGROUND

Pumps can be used to recirculate water in aquatic farms, such as recirculating aquaculture systems in which fish and other aquatic life are raised. Recirculating aquaculture systems generally include one or more tanks to house the fish, one or more water inlets into the tank, and one or more water outlets out of the tank. The water outlets are connected to an inlet of the pump. The pump generally propels the water through a filter and back into the tank through the water inlets.

Conventional recirculating aquaculture systems have a sizable upfront cost to design and build, and also have high operating costs that make it difficult for recirculating aquaculture farmers to compete with other types of aquaculture farms, such as ponds and net pen operations. Conventional recirculating aquaculture systems usually provide manually adjusted oxygen flow into the tank and manually adjusted water flow through the culture tank depending upon the size or requirements of the aquatic life. As a result, typical recirculating aquaculture farms spend anywhere from $100,000.00 to $1,000,000.00 in electrical cost and $1,700 to $4,000 in oxygen costs on an annual basis. In fact, the highest operating costs for recirculating aquaculture farms are feed, electricity, and oxygen.

In conventional recirculating aquaculture systems, there are several parameters that must be frequently monitored by the farmers in order to determine when feed rates for the fish may be increased. Presently, aquaculture farmers must monitor fecal output of the fish daily. Every 30 minutes to 2 hours, they must monitor the amount of feed the fish can be induced to consume. In addition, they must monitor the oxygen consumption of the fish and the culture system water constantly. Therefore, a need exists for a way in which to lower the production cost and operating cost of recirculating aquaculture systems.

SUMMARY

Some embodiments of the invention provide a method of operating a pump in an aquaculture system including a culture tank that houses fish. The method can include monitoring a dissolved oxygen level in the culture tank, determining a flow rate threshold based on the dissolved oxygen level, and changing a speed of the pump to maintain a current flow rate through the culture tank above the flow rate threshold.

Some embodiments of the invention provide a recirculating aquaculture system including a culture tank, a sensor, a variable speed pump, and a controller. The sensor is configured to measure a dissolved oxygen level in the culture tank. The variable speed pump is configured to circulate water through the culture tank. The controller is in communication with the sensor and the variable speed pump, and is configured to determine an oxygen threshold, compare the oxygen threshold with the dissolved oxygen level measured by the sensor, and increase a speed of the variable speed pump to adjust a flow rate through the culture tank when the oxygen threshold is below the dissolved oxygen level measured by the sensor.

DETAILED DESCRIPTION

Figure 1:
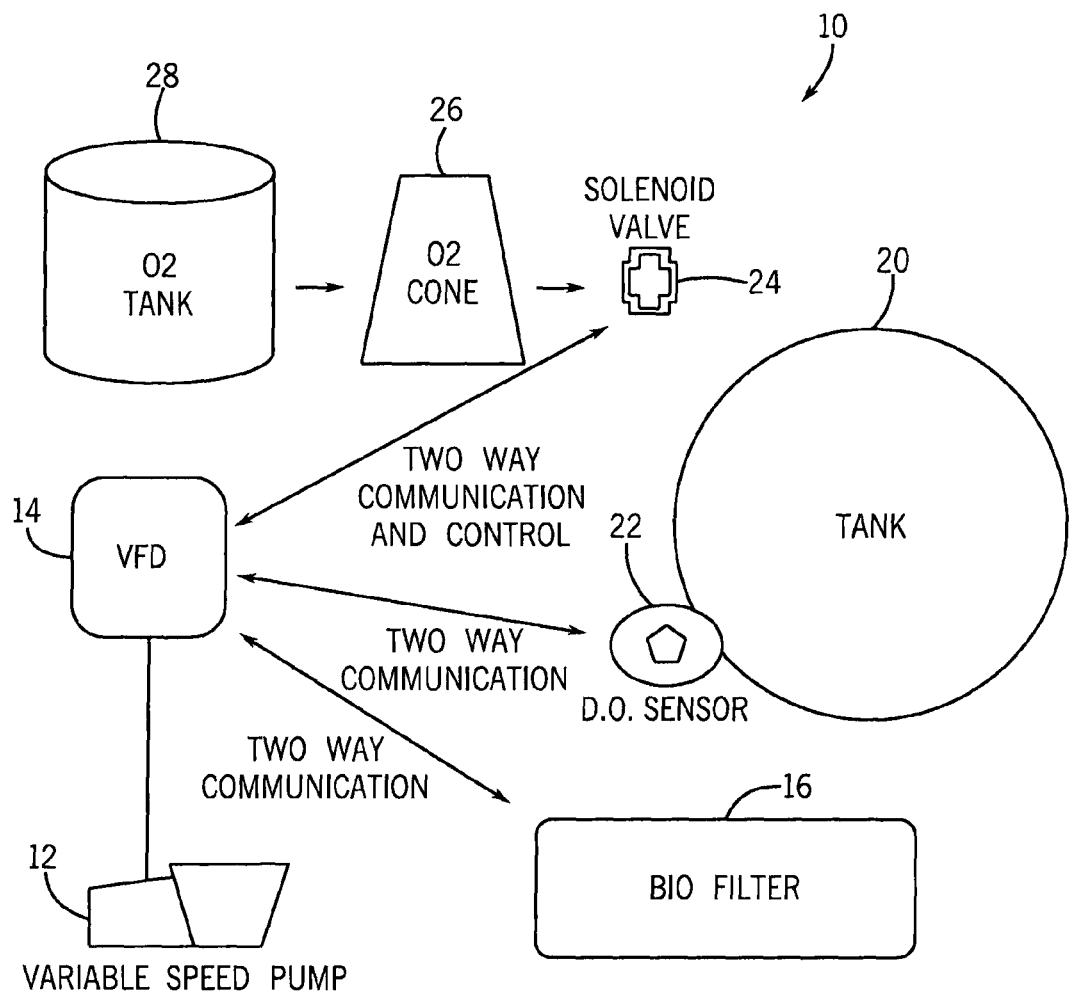
FIG. 1 is a block diagram of an aquaculture system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an aquaculture system 10 according to one embodiment of the invention. The aquaculture system 10 can include one or more variable speed pumps 12 in communication with one or more controllers 14, such as one or more variable frequency drives (VFD). If more than a single pump 12 is used, the pumps 12 can be controlled in a cascading manner. The aquaculture system 10 can include a biofilter 16 and sensors measuring one or more of the following: ammonia, nitrite, nitrate, and solids removal. The aquaculture system 10 can include one or more water tanks, or culture tanks, 20 housing the fish. The aquaculture system 10 can include a dissolved oxygen sensor 22 coupled to the culture tank 20. The aquaculture system can include a positional, remote-controlled, oxygen solenoid valve 24 coupled to the culture tank 20. The oxygen solenoid valve 24 can be coupled to an oxygen cone 26, which can be coupled to an oxygen tank 28.

The pump 12 can be a variable speed pump operated according to a flow control algorithm, as disclosed in U.S. Pat. No. 7,845,913 entitled "Flow Control" and issued Dec. 7, 2010, the entire contents of which is herein incorporated by reference. The controller 14 can read water quality information including dissolved oxygen, as well as other water quality variables. The controller 14 can be a separate component from the pump 12 or can be integrated into the variable speed pump 12.

The controller 14 can be connected to the various sensors, including the dissolved oxygen sensor 22, as well as the solenoid valve 24 in control of the oxygen supply. In some embodiments, the controller 14 can be in two-way communication with the biofilter 16, the dissolved oxygen sensor 22, and the solenoid valve 24. Two-way communication in the aquaculture system 10 can be performed as disclosed in U.S. Pat. No. 7,854,597 entitled "Pumping System with Two-Way Communication" and issued on Dec. 21, 2010, the entire contents of which is herein incorporated by reference.

The controller 14 can operate the pump 12 to control water flow and the solenoid valve 24 to control oxygen delivery based on the principles of fish growth. When fish are fingerlings, they require X amount of oxygen and Y amount of water flow to have the continuous and substantial growth that is required in aquaculture systems. As the fingerlings mature into market-size fish, the formulas change to the following:

$X$+Ratio of Respiration Required by Larger Fish (in ppm of oxygen)=New Oxygen Requirement/Time; and $Y$+Flow Required by Maturing Fish for Water Quality and Safe Swimming Velocity=Clean Water Standard of $X$ Ammonia/PH/Solids Removed, etc.

The new oxygen requirement/time can also incorporate the oxygen demand of the water with increased nutrient loading.

Presently, aquaculture farmers must monitor fecal output of the fish daily. Every 30 minutes to 2 hours, the farmers must monitor the amount of feed the fish can be induced to consume. In addition, the farmers must monitor oxygen consumption of the fish constantly. The aquaculture system 10 according to some embodiments of the invention allows the farmer to measure a single parameter (i.e., dissolved oxygen) that summarizes all conditions for continued feeding. In some embodiments, the aquaculture system 10 can be used to tell the farmer where and when to feed.

As the fish grow, their oxygen and water flow requirements change. As a result, the electrical and oxygen costs of an aquaculture farm change with the life cycle or respiration potential of a fish through its growth cycle. In other words, the electrical and oxygen costs of an aquaculture farm change with the dissolved oxygen requirements and water treatment needs of the fish as they grow. In conventional recirculating aquaculture systems, an operator must manually adjust oxygen flow and/or water flow (i.e., through manual valves to adjust flow paths) periodically to meet oxygen and water flow requirements.

The aquaculture system 10 according to embodiments of the invention can be used with any scale of culture tank(s) 20 through any part of the lifecycle of aquatic life requiring oxygen. The aquaculture system 10 can operate to keep dissolved oxygen substantially constant by varying the flow of water, coupled with the flow of oxygen, by monitoring and pinpointing respiration and circulation requirements. In other words, the controller 14 can monitor a dissolved oxygen level in the culture tank 20 and can increase oxygen flow into the culture tank 20 if the dissolved oxygen level is below an oxygen threshold. The controller 14 can also, or alternatively, determine a flow rate threshold based on the dissolved oxygen level, and increase water flow through the culture tank 20 by adjusting a speed of the pump 12 (e.g., by providing an updated speed control command to the pump 12) if the dissolved oxygen level is below the flow rate threshold. Accordingly, the dissolved oxygen level in the culture tank 20 can be increased by changing the speed of the pump 12 and increasing the flow rate of water through the culture tank 20.

In some embodiments, the controller 14 can incrementally increase the speed of the pump 12 until dissolved oxygen levels are at or above the oxygen threshold. In other words, the controller 14 can determine the oxygen threshold (e.g., based on respiration requirements of the aquatic life in the culture tank 20, as discussed above), compare the oxygen threshold to the measure dissolved oxygen level, and increase the speed of the pump 12 and, thus, the flow rate through the culture tank 20 when the measure dissolved oxygen level is below the oxygen threshold. The controller 14 can continuously monitor the dissolved oxygen level and increase the speed of the pump 12 until a flow rate through the culture tank 20 that maintains the dissolved oxygen level at or above the oxygen threshold is reached. In some embodiments, an operator can also manually adjust the speed of the pump 14 through a user interface of the controller 14, as further discussed below.

The aquaculture system 10 can cadence off of the requirements for the fish and only require full normal operation of the pump 12 toward the end of the aquatic life growth curve. This would potentially save the farmer 50 percent to 70 percent of the normal operating costs associated with water flow and oxygen delivery (e.g., electrical and oxygen costs).

Figure 2:
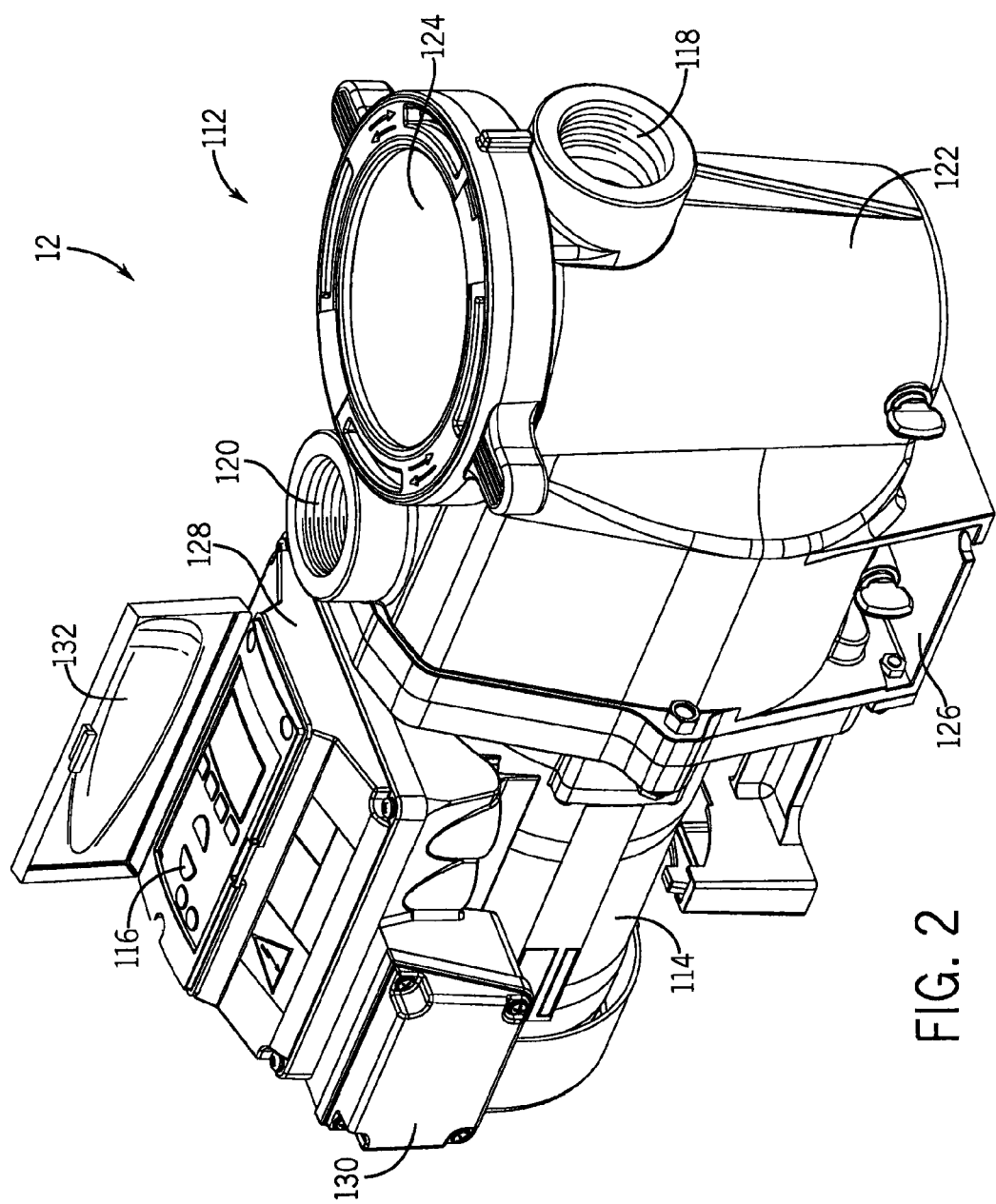
FIG. 2 is a perspective view of a pump for use in the system of FIG. 1.

FIG. 2 illustrates an embodiment of the pump 12 for use with the aquaculture system 10. The pump 12 can include a housing 112, a motor 114, and an on-board controller 116 (which can include the variable frequency drive controller 14). In some embodiments, the motor 114 can be a variable speed motor. In one embodiment, the motor 114 can be driven at four or more different speeds. The housing 112 can include an inlet 118, an outlet 120, a basket 122, a lid 124, and a stand 126. The stand 126 can support the motor 114 and can be used to mount the pump 12 on a suitable surface (not shown).

In some embodiments, the on-board controller 116 can be enclosed in a case 128. The case 128 can include a field wiring compartment 130 and a cover 132. The cover 132 can be opened and closed to allow access to the on-board controller 116 and protect it from moisture, dust, and other environmental influences. The case 128 can be mounted on the motor 114. In some embodiments, the field wiring compartment 130 can include a power supply to provide power to the motor 114 and the on-board controller 116.

Figure 3:
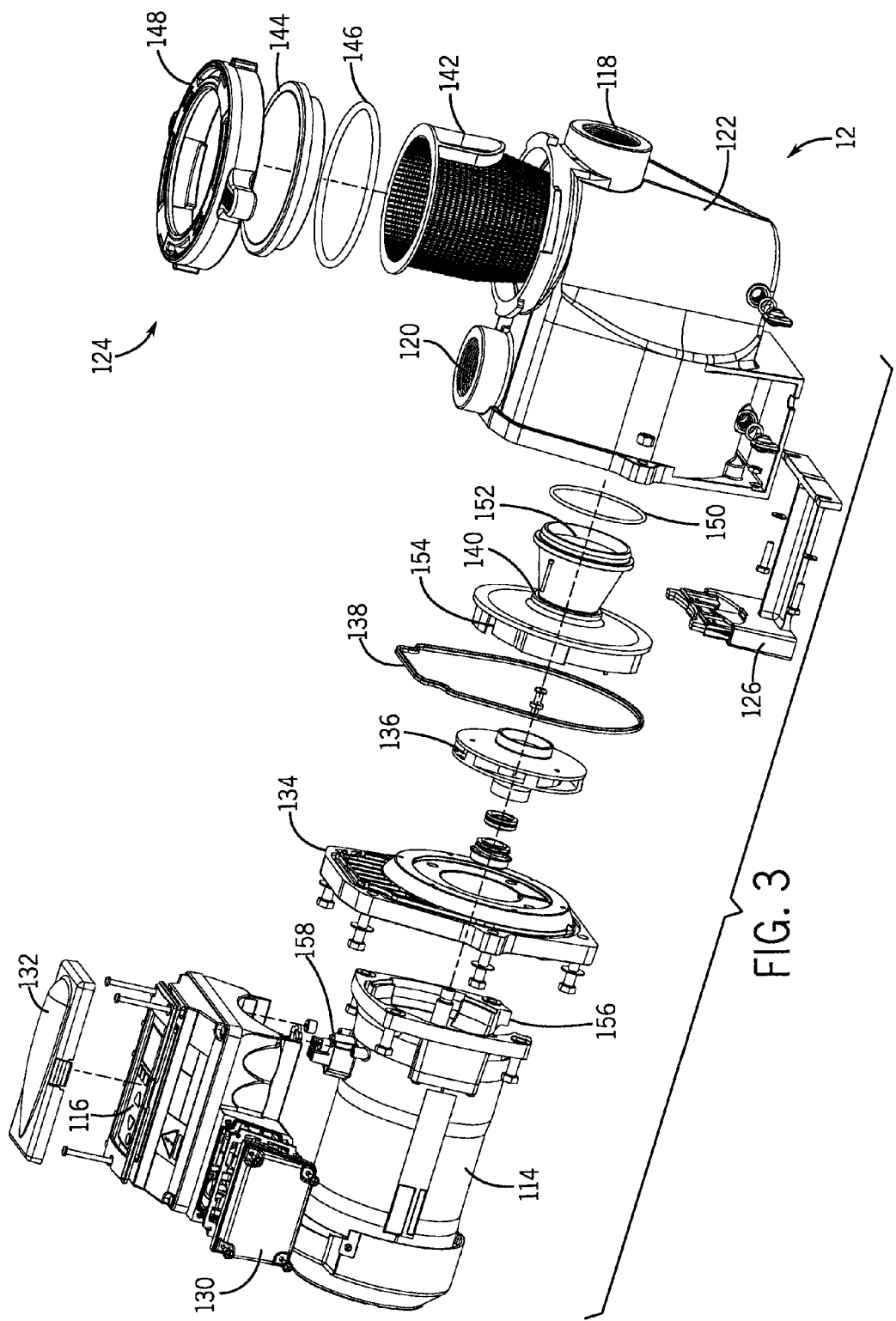
FIG. 3 is an exploded perspective view of the pump of FIG. 2.

FIG. 3 illustrates the internal components of the pump 12 according to one embodiment of the invention. The pump 12 can include a seal plate 134, an impeller 136, a gasket 138, a diffuser 140, and a strainer 142. The strainer 142 can be inserted into the basket 122 and can be secured by the lid 124. In some embodiments, the lid 124 can include a cap 144, an O-ring 146, and a nut 148. The cap 144 and the O-ring 146 can be coupled to the basket 122 by screwing the nut 148 onto the basket 122. The O-ring 146 can seal the connection between the basket 122 and the lid 124. An inlet 152 of the diffuser 140 can be fluidly sealed to the basket 122 with a seal 150. In some embodiments, the diffuser 140 can enclose the impeller 136. An outlet 154 of the diffuser 140 can be fluidly sealed to the seal plate 134. The seal plate 134 can be sealed to the housing 112 with the gasket 138. The motor 114 can include a shaft 156, which can be coupled to the impeller 136. The motor 114 can rotate the impeller 136, drawing fluid from the inlet 118 through the strainer 142 and the diffuser 140 to the outlet 120.

In some embodiments, the motor 114 can include a coupling 158 to connect to the on-board controller 116. In some embodiments, the on-board controller 116 can automatically operate the pump 12 according to at least one schedule. In some embodiments, the on-board controller 116 can allow a manual operation of the pump 12. In some embodiments, the on-board controller 116 can monitor the operation of the pump 12 and can indicate abnormal conditions of the pump 12.

Figure 4:
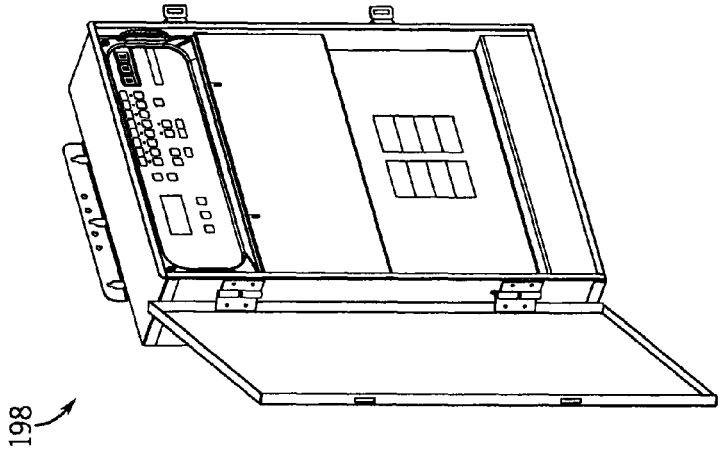
FIG. 4 is a front view of an on-board controller for use with the pump of FIGS. 2 and 3.

FIG. 4 illustrates a user interface 160 for the on-board controller 116 according to one embodiment of the invention. The user interface 160 can include a display 162, at least one speed button 164, navigation buttons 166, a start-stop button 168, a reset button 170, a manual override button 172, and a "quick clean" button 174. The manual override button 172 can also be called "time out" button. In some embodiments, the navigation buttons 166 can include a menu button 176, a select button 178, an escape button 180, an up-arrow button 182, a down-arrow button 184, a left-arrow button 186, a right-arrow button 188, and an enter button 190. The navigation buttons 166 and the speed buttons 164 can be used to program a schedule into the on-board controller 116. In some embodiments, the display 162 can include a lower section 192 to display information about a parameter and an upper section 194 to display a value associated with that parameter. In some embodiments, the user interface 160 can include light emitting diodes (LEDs) 196 to indicate normal operation and/or a detected error of the pump 12.

Figure 5:
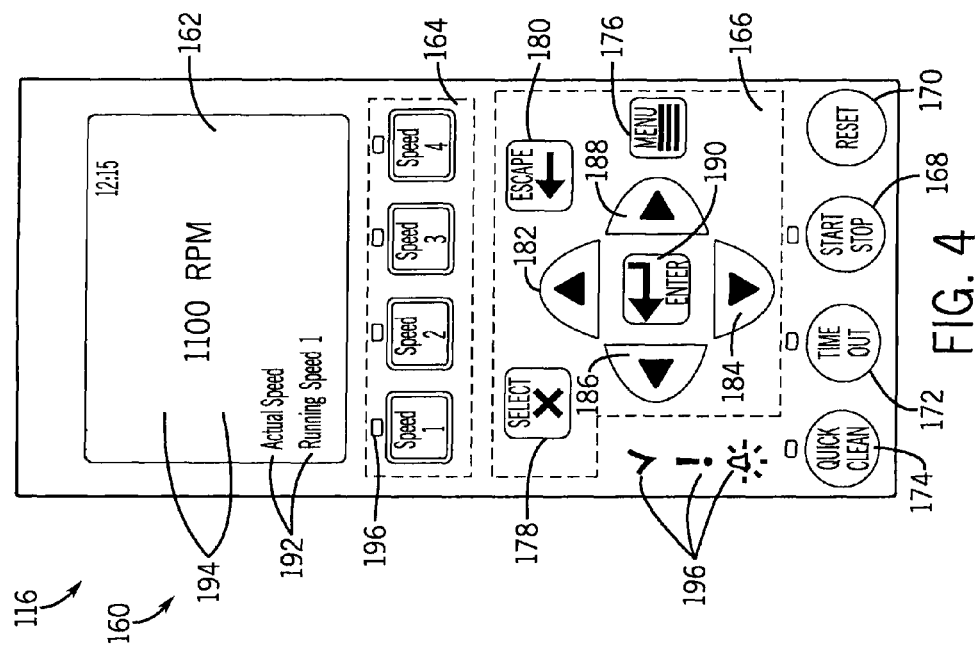
FIG. 5 is a perspective view of an external controller for use with the system of FIG. 1.

FIG. 5 illustrates an external controller 198 for the pump 12 according to one embodiment of the invention. The external controller 198 can communicate with the on-board controller 116. The external controller 198 can control the pump 12 in substantially the same way as the on-board controller 116. The external controller 198 can be used to operate the pump 12 and/or program the on-board controller 116, if the pump 12 is installed in a location where the user interface 160 is not conveniently accessible.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of operating a pump in an aquaculture system, the aquaculture system including a culture tank that houses aquatic life, a sensor, an oxygen cone in direct fluid communication with the culture tank through an oxygen solenoid valve, a biofilter in fluid communication with the culture tank and the pump, and a programmable controller in communication with the sensor, the oxygen solenoid, and the pump, the method comprising:
 recirculating water through the culture tank at a flow rate;
 recirculating the water through the biofilter;
 measuring a dissolved oxygen level in the culture tank with the sensor;
 setting a flow rate threshold with the programmable controller based on the dissolved oxygen level and oxygen requirements of the aquatic life in the culture tank;
 retrieving a current dissolved oxygen level measured by the sensor;
 comparing the flow rate threshold with the current dissolved oxygen level measured by the sensor; and
 when the current dissolved oxygen level is below the flow rate threshold, the programmable controller increasing a speed of the pump to increase the flow rate through the culture tank and operating the oxygen solenoid valve to control an oxygen flow into the culture tank until the dissolved oxygen concentration is greater than or equal to the set flow rate threshold.

2. The method of claim 1 and further comprising monitoring at least one of ammonia, nitrite, nitrate, and solids removal.

3. The method of claim 2 and further comprising monitoring using sensors in the biofilter.

4. The method of claim 1 and further comprising increasing oxygen flow into the culture tank if the dissolved oxygen level is below an oxygen threshold and remotely operating the solenoid valve in order to increase oxygen flow.

5. The method of claim 4 and further comprising providing two-way communication between the pump and the solenoid valve.

6. The method of claim 1 and further comprising using a flow control algorithm to operate the pump to maintain the flow rate.

7. The method of claim 1 wherein the flow rate threshold is a requirement for water quality and safe swimming velocity of the fish.

8. The method of claim 1 and further comprising determining when to feed the fish based on the dissolved oxygen level.

9. A recirculating aquaculture system for aquatic life, the system comprising:
 a culture tank configured to hold aquatic life therein;
 an oxygen cone in direct fluid communication with the culture tank through an oxygen solenoid valve;
 a sensor configured to measure a dissolved oxygen level in the culture tank;
 a variable speed pump configured to circulate water through the culture tank at a flow rate;
 a biofilter in fluid communication with the culture tank and the variable speed pump; and
 a programmable controller in communication with the sensor, the oxygen solenoid valve, and the variable speed pump, wherein the programmable controller is configured to:
 set a dissolved oxygen threshold for the culture tank based on an oxygen requirement of the aquatic life therein,
 retrieve a current dissolved oxygen level measured by the sensor, compare the dissolved oxygen threshold with the current dissolved oxygen level measured by the sensor, and when the current dissolved oxygen level is below the dissolved oxygen threshold, increasing the flow rate within the culture tank by increasing a speed of the variable speed pump and operating the oxygen solenoid valve to control an oxygen flow into the culture tank until the current dissolved oxygen level measured by the sensor is greater than or equal to the set dissolved oxygen threshold.

10. The recirculating aquaculture system of claim 9, wherein the controller includes a variable frequency drive.

11. The recirculating aquaculture system of claim 9, wherein the controller is configured to determine a flow rate threshold based on the dissolved oxygen level and increase the speed of the variable speed pump to adjust the flow rate through the culture tank above the flow rate threshold.

12. The recirculating aquaculture system of claim 9, wherein the controller is configured to update the dissolved oxygen threshold based on a respiration requirement of aquatic life in the culture tank.

13. The recirculating aquaculture system of claim 9, wherein the controller includes a user interface, and the controller is configured to change the speed of the variable speed pump based on user input from the user interface.

14. The recirculating aquaculture system of claim 9, wherein the controller is integrated into the variable speed pump.

15. The recirculating aquaculture system of claim 9, wherein the controller is configured to determine at least one condition for feeding aquatic life in the culture tank from the dissolved oxygen level measured by the sensor.

16. The recirculating aquaculture system of claim 9, wherein the controller is an on-board controller adjacent to the pump.

* * * * *